D. MOORE.
Churn-Dashers.

No. 150,969.  Patented May 19, 1874.

Attest.

J. H. Elliott
H. M. Matthews

Inventor.

Daniel Moore,
By G. L. Chapin,
Atty.

UNITED STATES PATENT OFFICE.

DANIEL MOORE, OF CHICAGO, ILLINOIS, ASSIGNOR OF ONE-HALF HIS RIGHT TO DANIEL HARRINGTON.

IMPROVEMENT IN CHURN-DASHERS.

Specification forming part of Letters Patent No. 150,969, dated May 19, 1874; application filed March 14, 1874.

*To all whom it may concern:*

Be it known that I, DANIEL MOORE, of Chicago, in the county of Cook and State of Illinois, have invented a new and useful Improvement in Churn-Dasher, of which the following is a specification:

The nature of the present invention consists in the novel construction of the dashers or agitators, which are formed by twisting strips of flat metal, terminating in shanks fastening to a horizontal disk or wheel, and being adjustable so as to agitate cream in the central or outer part of the churn-barrel, as hereinafter fully shown and described.

Figure 1:
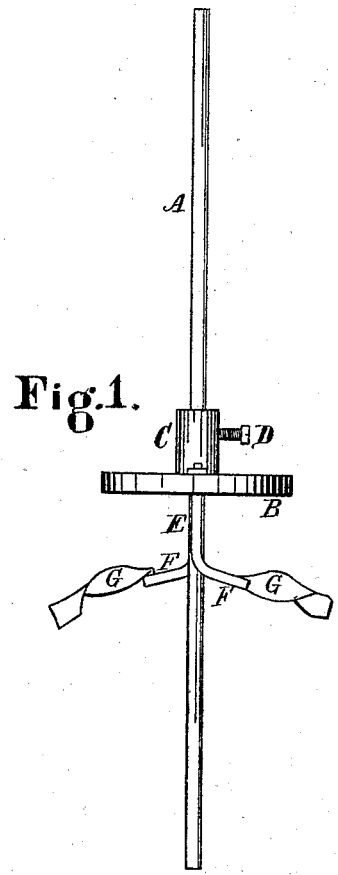
Figure 3:
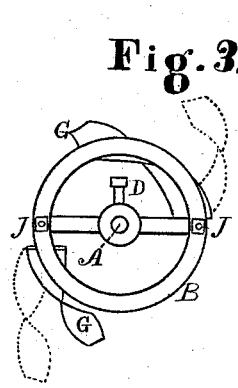
Figure 2:
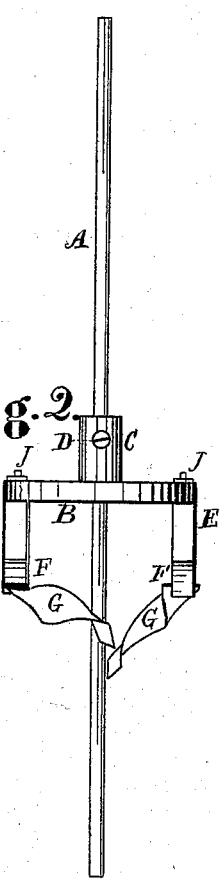

In the drawings, Figure 1 is an elevation of a dasher-rod provided with my improvement in agitators adjusted outwardly; Fig. 2, an elevation thereof with the agitators adjusted inwardly; Fig. 3, a horizontal view of the wheel, agitators, and dasher-rod.

A represents a rod, which is to be placed vertically in a churn-barrel by the ordinary bearings well known to the art, and it is to be driven by any suitable gearing which will give the agitators G a high rate of speed, as, for instance, two hundred and fifty revolutions per minute. A greater or less speed will answer the purpose, the time for churning being according to the speed of the agitators. B represents a disk or wheel secured to the rod A by means of a sleeve, C, and set-screw D, so that the agitators G may be set higher or lower in the churn-barrel according to the amount of cream churned at a time. E E represent arms which are pivoted to the wheel B at J, and bent forward at their lower ends F for the purpose of supporting the agitators G at the proper angle. These agitators are formed of short metal or other suitable material, and twisted, as shown, so that when passing through the cream the latter will be thoroughly broken and the butter-globules separated therefrom.

To put the device into use, the agitators G can be set outward or inward to suit the size of the churn-barrel by loosening the nuts J, which hold the arms E to the wheels B. The nuts then being tightened the agitators will be held in place for churning. When butter is to be gathered the agitators G can be adjusted inward, as shown in Fig. 2.

I claim and desire to secure by Letters Patent—

The combination of the adjustable twisted dashers or agitators G G with the bent arms E, wheel B, and rod A, arranged to operate as and for the purpose set forth.

DANIEL MOORE.

Witnesses:
G. L. CHAPIN,
J. H. ELLIOTT.